Figure 1:
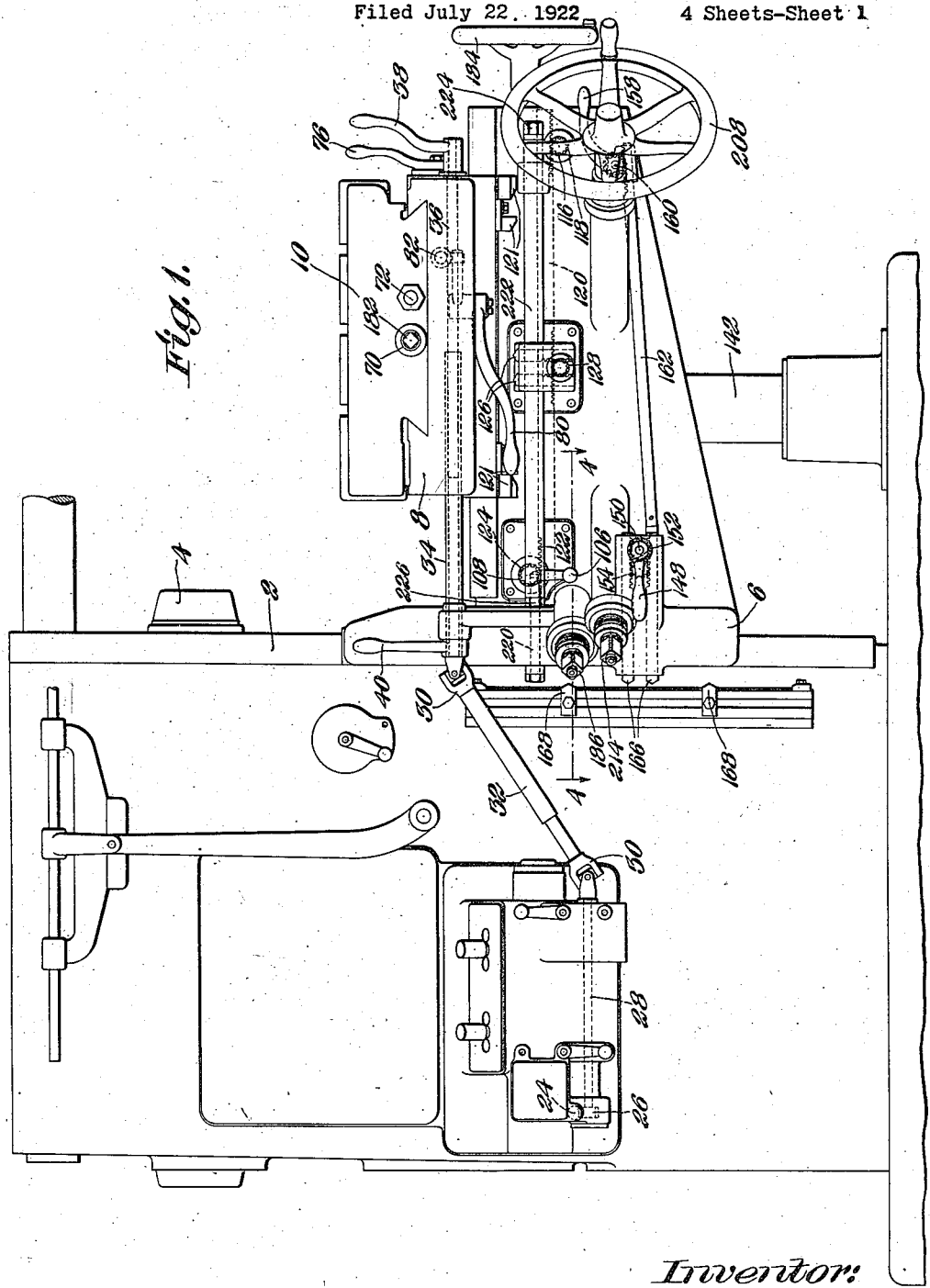

Jan. 15, 1924.

B. P. GRAVES

MILLING MACHINE

Filed July 22, 1922

1,480,901

4 Sheets-Sheet 1

Witness:
Alfred H. McGlinchey.

Inventor:
Benjamin P. Graves
Van Everen Fish Hildreth & Cary
Attys.

Jan. 15, 1924.

B. P. GRAVES

MILLING MACHINE

Filed July 22, 1922

1,480,901

4 Sheets-Sheet 2

Witness:
Alfred H. McGlinchey.

Inventor:
Benjamin P. Graves
by
Van Everen Fish Hildreth & Curry
Attys

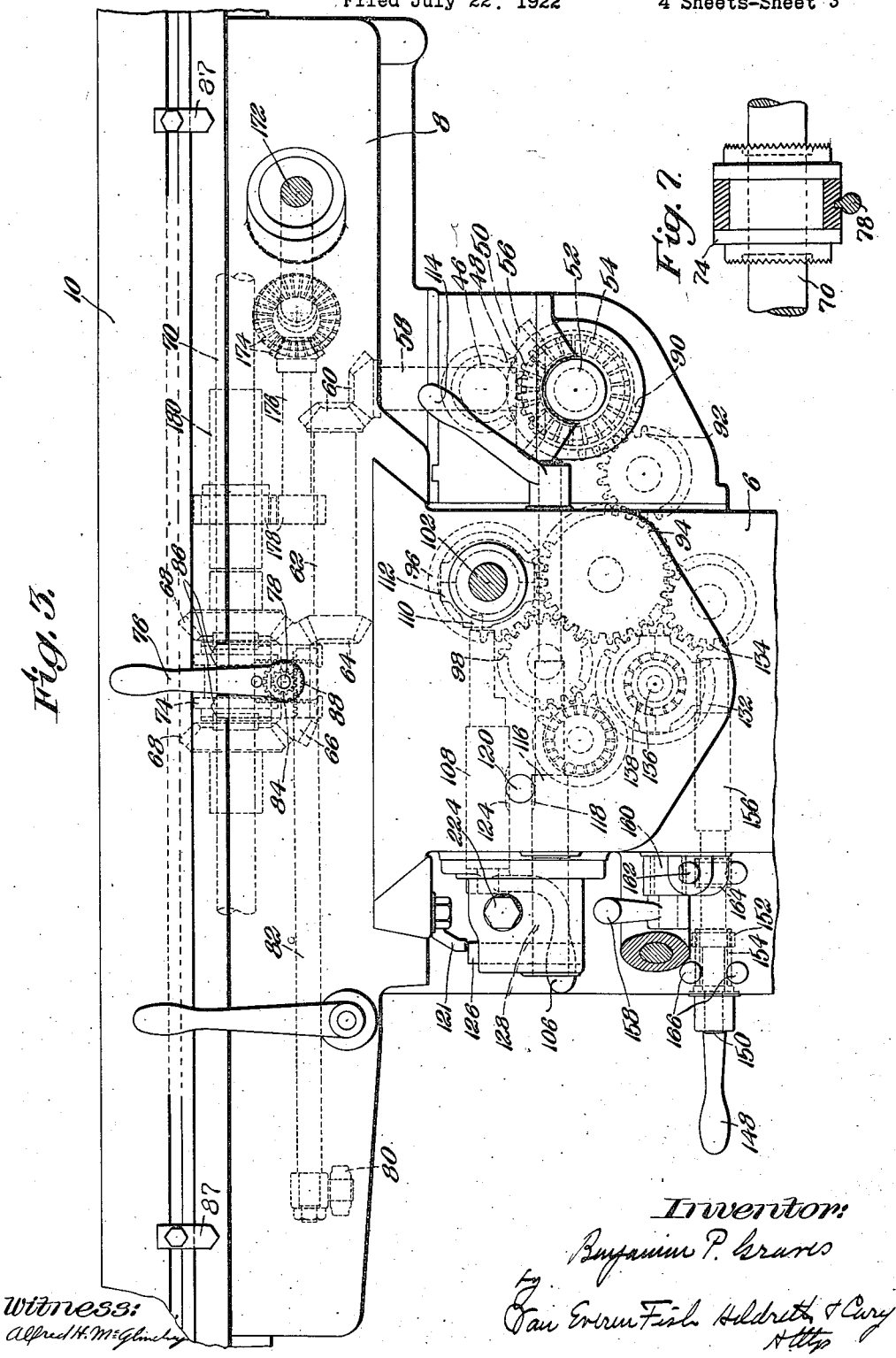

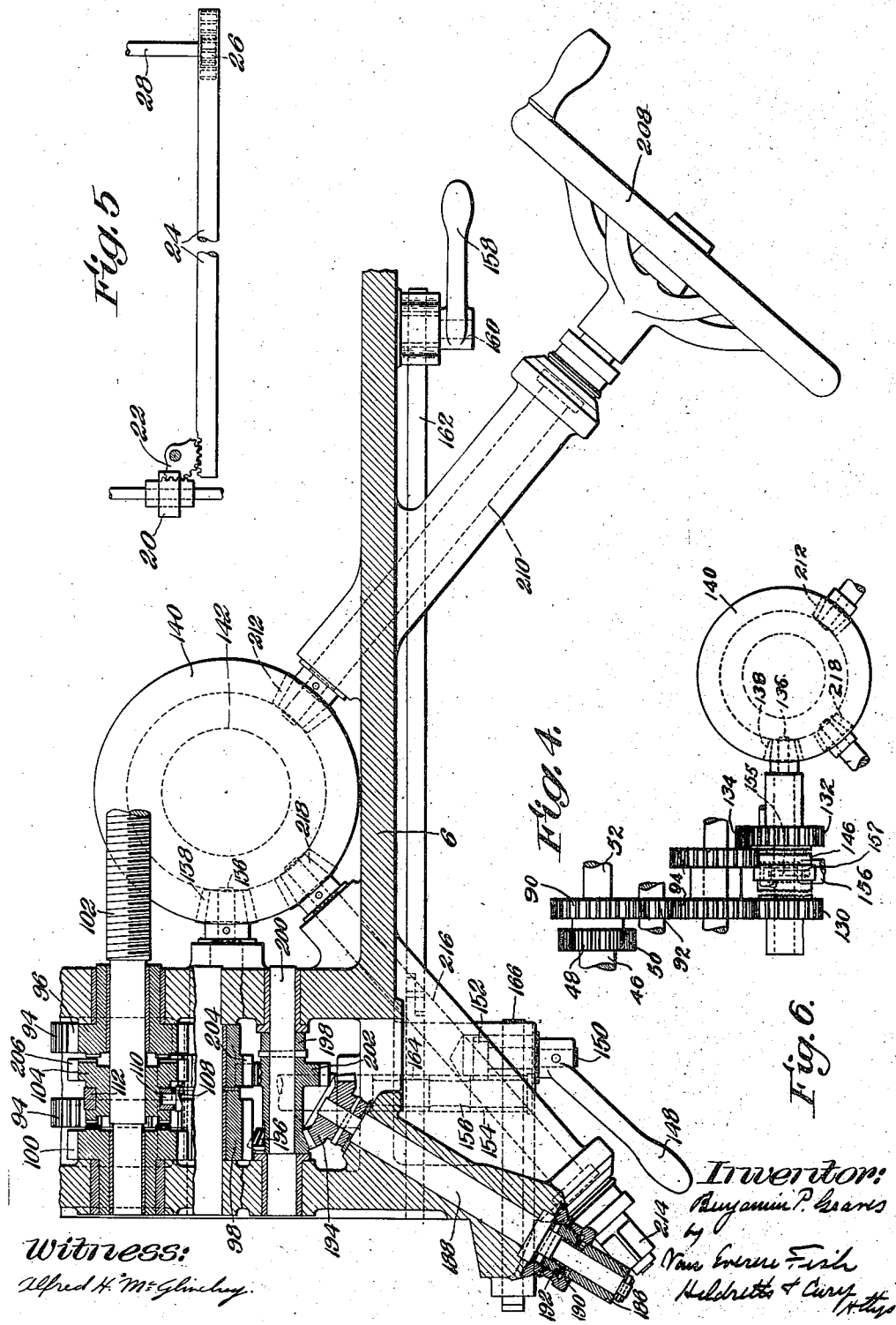

Patented Jan. 15, 1924.

1,480,901

UNITED STATES PATENT OFFICE.

BENJAMIN P. GRAVES, OF PROVIDENCE, RHODE ISLAND, ASSIGNOR TO BROWN AND SHARPE MANUFACTURING COMPANY, A CORPORATION OF RHODE ISLAND.

MILLING MACHINE.

Application filed July 22, 1922. Serial No. 576,787.

*To all whom it may concern:*

Be it known that I, BENJAMIN P. GRAVES, a citizen of the United States, residing at Providence, in the county of Providence and State of Rhode Island, have invented certain new and useful Improvements in Milling Machines; and I do hereby declare the following to be a full, clear, and exact description of the invention, such as will enable others skilled in the art to which it appertains to make and use the same.

The invention relates to milling machines and more particularly to machines of the column and knee type in which the work table is longitudinally movable on a saddle which is mounted to move transversely on a vertically movable knee.

Machines of this type are usually provided with automatic feed mechanisms which may be thrown into operation by the operator to feed the table, saddle or knee in either direction, and also with means through which the operator, when stationed at the front of the machine, may manually move the table, saddle or knee in either direction in adjusting these parts when setting up the machine for any piece of work, or in bringing the work into proper relation to the cutter preparatory to throwing in the appropriate automatic feed. It is the object of the present invention to enable the operator to rapidly and accurately make the required adjustments or movements and to thus increase the production and efficiency of the machine. To this end the invention contemplates the provision, in addition to the usual adjusting means at the front of the machine, of means through which the operator may make the requisite adjustments or movements of the work while stationed at the left side of the column and to the rear of the table where he can inspect the cutter and work whether setting up or operating upon work which is to be milled at a point not visible from the front of the machine. The operator in adjusting or operating upon any piece of work is thus enabled to station himself where he can inspect the cutter and work at the point where the cutter is operating or is to operate and can, therefore, accurately and quickly make required adjustments. The efficiency and production of the machine may be, and preferably is, increased by also providing controlling devices accessible at each station through which the operator may throw in the appropriate automatic feed after making the proper preliminary adjustments.

Figure 2:
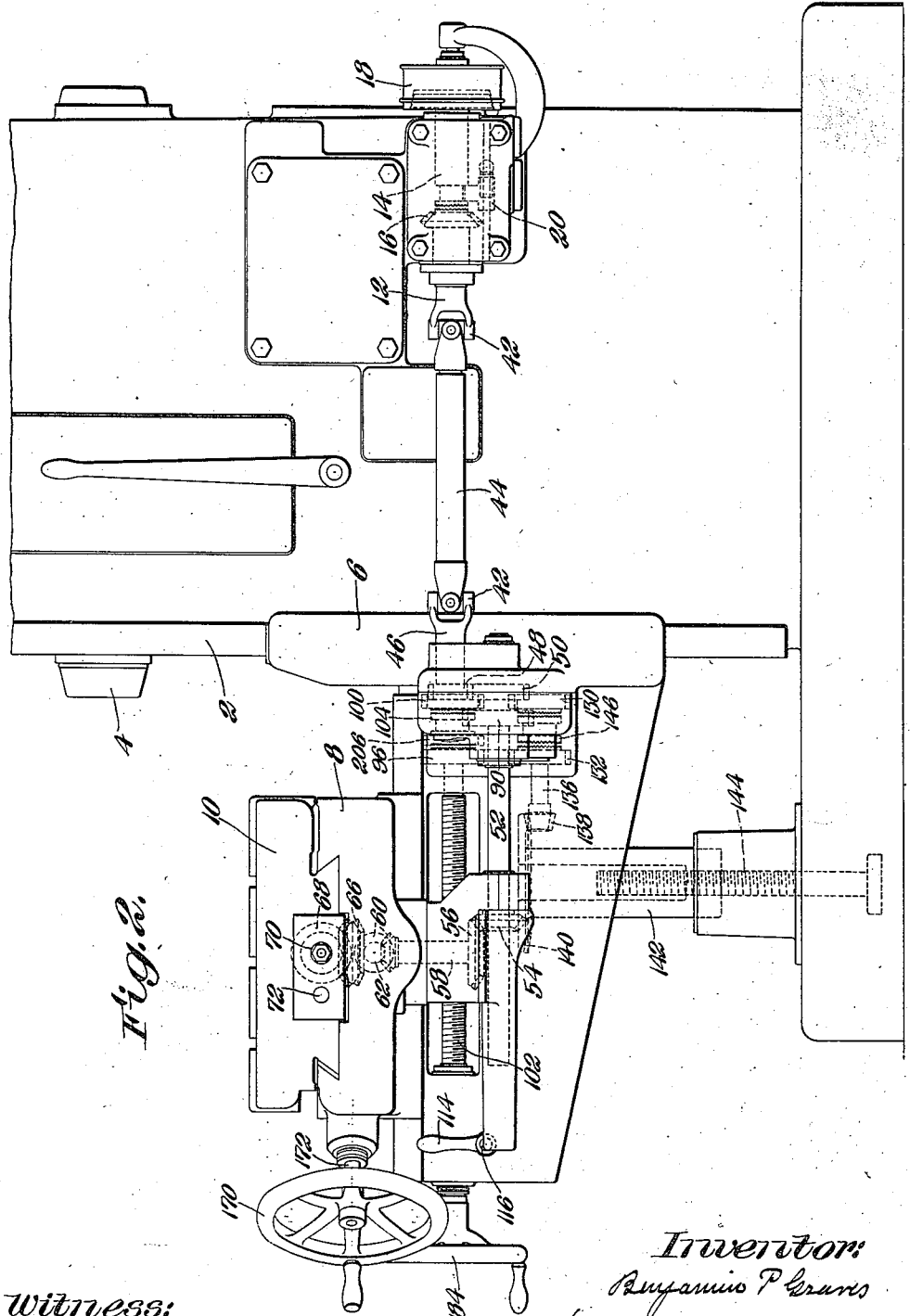

The invention will be understood from the following description of the mechanisms shown in the accompanying drawings in which Fig. 1 is a left side elevation of so much of a milling machine as is necessary to illustrate the application of the preferred form of the invention thereto, Fig. 2 is a right side elevation, Fig. 3 is a partial front view, Fig. 4 is a horizontal sectional detail on approximately line 4—4, Fig. 1, Fig. 5 is a detail of the connections through which the clutch for controlling the feed and quick traverse is operated, Fig. 6 is a detail view of the vertical feed gearing, and Fig. 7 is a detail of the table feed clutch.

In the drawings the invention is shown applied to a machine of the knee and column type provided with a fixed vertical column 2 in which the spindle 4 is mounted and on which the vertically movable knee 6 is guided, and also provided with the transversely movable saddle 8 guided on the knee and the longitudinally movable table 10 guided on the saddle. The machine is also provided with automatic feed through which either the knee, saddle or table may be automatically moved at either a slow feeding rate or a quick traverse rate in either direction, with tripping devices for automatically stopping the feed, and with devices through which the operator may manually control the throwing into or out of operation of the feed. There are two sets of feed control devices, one set arranged where they are readily accessible to the operator, when stationed at the front of the machine, and the other set arranged where they are readily accessible to the operator when stationed at the left hand side of the column and at the rear of the table. The machine is also provided with means operable by the operator when stationed at the front of the machine through which he may manually move or adjust the table, saddle or knee and with additional means operable by the operator when stationed at the left of the column and at the rear of the table through which he may also manually adjust or move these parts. The operator is, therefore, enabled to quickly, conveniently and accurately adjust the work with relation to the cutter and control the automatic feed when stationed either at the front of the machine where he can best inspect the work and cutter in operating upon work at points best seen from this station, or when stationed at the rear of the table when operating upon work which is to be milled at points best seen from this station and not visible from the front of the machine.

The automatic feed mechanisms are actuated from a shaft 12 mounted at the right side of the column 2 which may be driven through a clutch 14 keyed to slide thereon either at a slow feeding rate or at a quick traverse rate by shifting the clutch either into engagement with a slowly rotating gear 16 or into engagement with a fast rotating pulley 18. The clutch may be shifted through a slide block 20 engaging a groove in the clutch and provided with rack teeth engaged by a segment 22, Figs. 2 and 5. The segment is engaged by rack teeth on a slide bar 24 extending from the right to the left side of the column and there engaged by a pinion 26 secured to the rear end of a shaft 28. The front end of the shaft is connected by universal joints 30 and extensible shaft 32 with a shaft 34 mounted in the knee and having a sliding connection with a shaft 36 mounted in the saddle. The front end of the shaft 36 is provided with an operating lever 38 through which the operator may shift the quick traverse and feed clutch while stationed at the front of the machine. An operating lever 40 is also secured to the rear end of the shaft 34 through which the operator may also shift this clutch when at his station at the rear of the table.

Motion is transmitted from the shaft 12 through universal joints 42 and the extensible shaft 44 to a shaft 46 mounted on the knee and connected through different trains of gears to transmit motion to the table, saddle or knee. The inner end of the shaft 46 carries a pinion 48 which engages a gear 50 secured to the rear end of a shaft 52 mounted on the knee and having a sliding driving connection with a beveled gear 54 mounted on the saddle and forming a part of the table actuating mechanism. The gear 54 engages a gear 56 on the lower end of a shaft 58 mounted on the saddle, the upper end of which is connected by beveled gears 60 with one end of a shaft 62, the other end of which carries a beveled gear 64 engaging a double beveled gear 66. The gear 66 engages and drives in opposite directions two beveled gears 68 mounted on the saddle and turning freely on the feed shaft 70 which is mounted in the table and is connected to rotate a nut not shown mounted on the saddle and engaging a screw shaft 72 fixed to the table. A clutch 74, having a driving connection with the shaft 70 is arranged between the gears 68 and may be engaged with one or the other to drive the feed shaft in either direction. The clutch may be shifted into engagement with either of the gears by the operator when stationed at the front of the machine through a controlling lever 76 secured to the forward end of a rock shaft 78, the rear end of which is connected to shift the clutch. This clutch may also be shifted by the operator when stationed at the rear of the table by means of a lever 80, the rear end of which is arranged within his convenient reach and the forward end of which is connected to one end of a rack bar 82, the other end of which engages a pinion 84 on the rock shaft 78. The connections between the clutch and controlling levers are so arranged that movement of either controlling lever in a given direction will cause the table to be automatically moved in the same direction. The clutch may be automatically moved into neutral position to disconnect the feed at the end of the travel of the table in either direction by means of one or the other of two vertically movable plungers 86 which are provided with rack teeth engaging a pinion 88 secured to the rock shaft 78 and the upper ends of which are projected into the path of stop dogs 87 adjustably mounted on the table.

Motion is transmitted from the shaft 52 to the saddle through a train of gears comprising a gear 90 on the shaft 52, an intermediate gear 92, and two connecting gears 94, one of which engages a gear 96 and the other of which engages an intermediate gear 98 engaging a gear 100. Through this train of gearing the gears 96 and 100 are rotated in opposite directions and these gears are mounted in the knee to turn freely about the inner end of the screw threaded shaft 102. A clutch 104 is connected with the shaft 102 between the opposing faces of the gears 96 and 100 and the shaft may be rotated in either direction by shifting the clutch into engagement with one or the other of the gears. The shaft 102 is threaded through a nut mounted on the saddle so that the saddle is moved transversely in one direction or the other by rotation of the shaft. The clutch may be shifted by the operator when stationed at the rear of the table by a lever 106 secured to the outer end of a rock shaft 108, the inner end of which is connected to shift the clutch by means of a pin 110 which enters a shoe 112 arranged in an annular groove in the clutch. The clutch may be shifted by the operator when stationed at the front of the machine through a lever 114 arranged at the right side of the saddle and secured to the outer end of a rock shaft 116. The rock shaft is provided with gear teeth 118 engaging rack teeth on the under side of a rack bar 120 which is also provided with rack teeth 122 on its upper side engaging gear teeth 124 formed on the rock shaft 108. Through these controlling devices the operator may control the transverse speed when at either his front or rear station and the connections between the controlling levers and clutch are such that a movement of either controlling device in a given direction causes the saddle to be fed in that direction. The clutch may be automatically shifted into neutral position at the end of the travel of the saddle in either direction by one or the other of two vertical plungers 126 which are provided with rack teeth engaging gear teeth formed on a rock shaft 128 which is also provided with teeth engaging rack teeth on the under side of the bar 120. The plungers are operated by dogs 121 on the saddle.

Motion is transmitted from the shaft 52 to the knee through a train of gearing comprising the intermediate gear 92 and the gears 94, one of which directly drives a gear 130 and the other of which drives an opposed gear 132 in the opposite direction through an intermediate gear 134. The gears 130 and 132 are mounted to rotate freely about a shaft 136 mounted on the knee and provided at its forward end with a beveled pinion 138 which engages a gear 140 on the upper end of a screw threaded sleeve 142 which is also mounted in the knee. The sleeve 142 engages a vertical screw threaded shaft 144 which is fixed to the base of the machine. A clutch 146 is connected with the shaft 136 between the oppositely rotating gears 130, 132 and may be shifted into engagement with one or the other to rotate the sleeve 142 in either direction and thus move the knee up or down. The clutch may be shifted by the operator when stationed at the rear of the table by a lever 148 secured to the outer end of a short rock shaft 150, the inner end of which is provided with a pinion 152 engaging a long-faced pinion 154 on a clutch shifting rock shaft 156. The inner end of the rock shaft is provided with a projecting rib 155 engaging a shoe 157 mounted in an annular groove in the clutch the construction being similar to that shown in Fig 7. The clutch may be shifted by the operator when at his front station by a lever 158 secured to a rock shaft 160 which is provided with gear teeth engaging teeth on the front end of a sliding bar 162, the rear end of which is provided with rack teeth engaging a pinion 164 on the rock shaft 156. These controlling devices and connections are so arranged that the movement of either controlling device in a given direction will cause the knee to be moved in the same direction. These controlling devices and connections are so arranged that the movement of either controlling device in a given direction will cause the knee to be moved in the same direction. The clutch may be automatically moved to mid-position through one of two plungers 166 which are provided with rack teeth engaging the broad-faced pinion 154 on the rock shaft 156. These plungers are operated by dogs 168 adjustably secured to the side of the column.

The table may be manually adjusted by the operator when stationed at the front of the machine through a hand wheel 170 connected with a shaft 172 mounted on the saddle and connected by beveled gears 174 with a shaft 176 which is in turn connected through gears 178 with a sleeve 180 having a sliding and driving connection with the feed shaft 70. The table may be adjusted manually by the operator when at his rear station by the application of a crank handle to the squared end 182 of the feed shaft.

The saddle may be adjusted manually on the knee by a hand wheel 184 mounted on the forward end of the screw-threaded shaft 102. The saddle may be adjusted by the operator when at his rear station by the application of a crank handle to the squared clutch sleeve 186 which is mounted on the outer end of a shaft 188 and is provided with clutch teeth adapted to engage a sleeve 190 fixed to the shaft, the clutch sleeve being normally held out of engagement by the spring 192. The inner end of the shaft 188 carries a beveled gear 194 engaging a gear 196 on a sleeve 198 which is secured to the shaft 200 and is provided with a gear 202. This gear engages a gear 204 which is mounted on the same shaft as the intermediate gear 98 and engages a gear 206 formed on the clutch 104. Through this mechanism rotary motion is transmitted from the shaft 188 to the clutch 104 to rotate the screw shaft 102 in either direction and thus adjust the saddle.

The knee may be adjusted by the operator when at the front of the machine through a hand wheel 208 on the forward end of a shaft 210 mounted in the saddle and provided at its rear end with a beveled pinion 212 engaging the beveled gear 140. The saddle may also be adjusted by the operator when at his rear station by a crank lever applied to a squared clutch sleeve 214 similar to the clutch sleeve 186 and mounted on the outer end of a shaft 216 which is mounted in the saddle and is provided at its rear end with a pinion 218 engaging the beveled gear 140.

The knee may be secured in adjusted position by a clamping bolt 220, the forward end of which is screw threaded and is engaged by screw threads in the rear end of a shaft 222. The shaft extends to the front of the knee and its front end is provided with a polygonal head 224 to which the operator may apply a wrench when stationed at the front of the machine. The rear end of the shaft is also provided with a polygonal head 226 to which the operator may apply a wrench when at his rear station.

As above indicated the provision of means operable by the operator when stationed at the rear of the table for manually actuating the mechanisms through which movement is imparted to the table, saddle or knee, as well as means operable by the operator when stationed at the front of the machine for manually actuating each of these mechanisms, enables the operator to quickly and accurately adjust and position the work relatively to the tool while stationed where he can best inspect the tool and point on the work at which the tool is to operate, whatever the character of the work. This feature, in connection with the controlling devices described, enables him to quickly and accurately start the feed after making the requisite preliminary adjustment and further contributes to the efficiency and production of the machine.

While it is preferred to employ the specific construction and arrangement of parts shown and described in embodying the invention in the machine having the general construction and arrangement of parts shown and described this construction and arrangement is not essential to the broader features of the invention and may be varied or modified as found desirable or best suited to the construction and arrangement of the mechanisms in the machine to which the invention is to be applied.

What is claimed is:

1. A milling machine having, in combination, a spindle, a work supporting table, a saddle, a knee, mechanisms for moving the table, saddle and knee, means operable by the operator when stationed at the front of the machine for manually actuating each of said mechanisms, and means operable by the operator when stationed at the rear of the table for manually actuating each of said mechanisms.

2. A milling machine having, in combination, a spindle, a work supporting table, a transversely movable saddle on which the table is movable longitudinally, mechanisms for moving the table and saddle, means operable by the operator when stationed at the front of the machine for manually actuating said mechanisms, and means operable by the operator when stationed at the rear of the table for manually actuating said mechanisms.

3. A milling machine having, in combination, a spindle, a work supporting table, a saddle on which the table is mounted, mechanism for moving the saddle transversely, means operable by the operator when stationed at the front of the machine for manually actuating said mechanism, and means operable by the operator when stationed at the rear of the table for manually actuating said mechanism.

4. A milling machine having, in combination, a spindle, a work supporting table, a saddle, mechanism for automatically feeding the saddle, means operable by the operator when stationed at the front of the machine for manually adjusting the saddle and for also controlling the automatic feed, and means operable by the operator when stationed at the rear of the table for manually adjusting the saddle and for also controlling the automatic feed.

5. A milling machine having, in combination, a spindle, a work supporting table, a saddle, a knee, automatic feed mechanisms for the table, saddle and knee, means operable by the operator when stationed at the front of the machine for adjusting the table, saddle or knee and for also controlling their automatic feed, and means operable by the operator when stationed at the rear of the table for manually adjusting the table, saddle or knee and for also controlling their automatic feed.

6. A milling machine having, in combination, a spindle, a work supporting table, a saddle, a knee, means operable by the operator when stationed at the front of the machine for manually adjusting the knee, means operable by the operator when stationed at the rear of the table for manually adjusting the knee, and means for clamping the knee in adjusted position operable by the operator when at either station.

7. A milling machine having, in combination, a spindle, a work supporting table, a saddle on which the table is mounted, mechanism for moving the saddle in either direction including a clutch, and means operable by the operator when stationed at the rear of the table for manually rotating the clutch to move the saddle.

8. A milling machine having, in combination, a spindle, a work supporting table, a saddle on which the table is mounted, a knee on which the saddle is mounted, a feed shaft for the saddle mounted on the knee, means at the front of the shaft for manually operating it, mechanism for automatically operating the shaft including a clutch connected to the rear end of the shaft, a shaft on the knee provided with means through which the operator may manually turn it when stationed at the rear of the table and gearing for transmitting motion from the said shaft to the clutch.

9. A milling machine having, in combination, a spindle, a support for the work, mechanism for automatically moving the support in either of two directions, two controller levers for said mechanism, one arranged to be operated by the operator when stationed at the front and the other arranged to be operated by the operator when stationed at the rear of the support, and connections through which movement of either lever from mid position in a given direction starts the support in that direction.

10. A milling machine having, in combination, a spindle, a table, a saddle, a knee, mechanisms for moving the table, saddle or knee in either direction, two controller levers for each mechanism, one arranged to be operated by the operator when stationed at the front, and the other arranged to be operated by the operator when stationed at the rear of the table, and connections through which movement of any lever from mid-position in a given direction starts the corresponding work supporting member in that direction.

BENJAMIN P. GRAVES.